(12) United States Patent
Wen

(10) Patent No.: US 7,651,281 B2
(45) Date of Patent: Jan. 26, 2010

(54) SURVEILLANCE CAMERA

(75) Inventor: Pei-Chun Wen, Taipei Hsien (TW)

(73) Assignee: Pal Tate Industrial Co., Ltd., Taipei (TW)

( * ) Notice: Subject to any disclaimer, the term of this patent is extended or adjusted under 35 U.S.C. 154(b) by 193 days.

(21) Appl. No.: 12/007,114

(22) Filed: Jan. 7, 2008

(65) Prior Publication Data

US 2009/0175612 A1 Jul. 9, 2009

(51) Int. Cl.
*G03B 17/00* (2006.01)
*H04N 5/225* (2006.01)

(52) U.S. Cl. .................................. 396/427; 348/373
(58) Field of Classification Search ............. 396/427
See application file for complete search history.

(56) References Cited

U.S. PATENT DOCUMENTS

| 4,080,629 | A | * | 3/1978 | Hammond et al. | 348/373 |
| 5,473,368 | A | | 12/1995 | Hart | 348/155 |
| 6,912,007 | B2 | * | 6/2005 | Gin | 348/373 |
| 7,011,460 | B1 | * | 3/2006 | Todd et al. | 396/427 |
| 2001/0047743 | A1 | * | 12/2001 | Raad et al. | 109/50 |
| 2006/0109374 | A1 | | 5/2006 | Cheng | 348/373 |

FOREIGN PATENT DOCUMENTS

| EP | 1 381 005 A1 | 1/2004 |
| JP | 2000-188706 | 7/2000 |
| JP | 2004-159253 A | 6/2004 |

OTHER PUBLICATIONS

Machine English translation of JP 2000-188706, Jul. 4, 2000, 9 pages, cited on applicant's IDS of Sep. 12, 2008 to Secom Co. Ltd.*

* cited by examiner

*Primary Examiner*—Melissa J Koval
(74) *Attorney, Agent, or Firm*—Muncy, Geissler, Olds & Lowe, PLLC

(57) ABSTRACT

A surveillance camera has a positioning base, a mounting base, a globe and a camera assembly. The positioning base is attached to a ceiling or a wall or the like. The mounting base may latch to or detach from the positioning base and has a tapered sidewall, a panel recess formed in the sidewall and an illuminator mounted in the panel recess. The illuminator illuminates an area of interest and has multiple light-emitting diodes (LEDs) mounted on a substrate. The LEDs provide a wider field of illumination and more intense light. The camera assembly is attached pivotally to the mounting base. Therefore, the surveillance camera can get clearer and more complete images.

11 Claims, 7 Drawing Sheets

SURVEILLANCE CAMERA

BACKGROUND OF THE INVENTION

1. Field of the Invention

The present invention relates to a surveillance camera, especially to a camera that has a light-emitting diode module and a wide illuminating field.

2. Description of the Prior Arts

Surveillance cameras are attached to a ceiling, a wall or the like of buildings, especially in elevators, or at important intersections to record or monitor events in those places and provide instant reports or powerful evidence against criminal activity.

With reference to FIG. 6, a conventional surveillance camera has a base (60), a globe (70), a bracket and a camera assembly (80).

The base (60) is attached securely to a ceiling, a wall or the like to point the surveillance camera at a specific area of interest and has an inner surface and a recess. The recess is formed in the inner surface of the base (60).

The globe (70) is mounted against the inner surface of the base (60) and covers the recess of the base (60).

The bracket is mounted in the recess of the base (60) and has two arms (61).

The camera assembly (80) is mounted pivotally between the two arms (61) of the bracket and has an outer surface, a lens (81), a circuit board (82), multiple packaged light-emitting diodes (83) and a light shade (84). The lens (81) is mounted on and protrudes transversely from the outer surface of the camera assembly (80). The circuit board (82) is mounted in front of the outer surface of the camera assembly (80) around the lens (81) and has an outer surface and a mounting hole (821). The mounting hole (821) is mounted around the lens (81). The packaged light-emitting diodes (83) are mounted on the outer surface of the circuit board (82) to illuminate the area of interest and to allow the lens (81) to get clear images. The light shade (84) is attached to the outer surface of the circuit board (82), is mounted around the mounting hole (821) of the circuit board (82) and the lens (81) to keep light from the packaged light-emitting diodes (83) from shining directly into the lens (81).

With further reference to FIG. 7, the conventional surveillance camera has a number of shortcomings. With the circuit board (82) being mounted around the lens (81) in front of the outer surface of the camera assembly (80), the direction in which the lens (81) can point is limited since the packaged light-emitting diodes (83) will abut the base (60) at extreme angles. Moreover, since each packaged light-emitting diode (83) has only one chip packaged inside, it is always designed to condense its light and get brighter light. Thus, the field and depth of illumination of the packaged light-emitting diodes (83) are reduced and are narrower than the field of view of the lens (81). Edges of the field of view of the lens (81) are often too dim to distinctly discern images. Furthermore, the surveillance camera with the camera assembly (80) mounted in the base (60) is difficult to mount on a ceiling or wall and aim precisely at the area of interest. Thus, several attempts are often required to mount and aim the surveillance camera precisely, during which the camera assembly (80) might be damaged. The whole surveillance camera must often be removed from the ceiling or the wall to be maintained, which is troublesome and might cause the ceiling or the wall to become unsightly.

To overcome the shortcomings, the present invention provides a surveillance camera to mitigate or obviate the aforementioned problems.

SUMMARY OF THE INVENTION

The main objective of the present invention is to provide a surveillance camera that has adequate illumination to cover a field of view of the surveillance camera.

The surveillance camera in accordance with the present invention comprises a positioning base, a mounting base, a globe and a camera assembly. The positioning base is attached to a ceiling or a wall or the like. The mounting base may latch to or detach from the positioning base and has a tapered sidewall, a panel recess and an illuminator. The panel recess is formed in the sidewall. The illuminator is mounted in the panel recess, illuminates an area of interest and has a board, a substrate mounted on the board and multiple light-emitting diodes (LEDs) mounted on the substrate. The LEDs provide a wider field of illumination and more intense light. The camera assembly is attached pivotally to the mounting base. Therefore, the surveillance camera can get clearer and more complete images.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
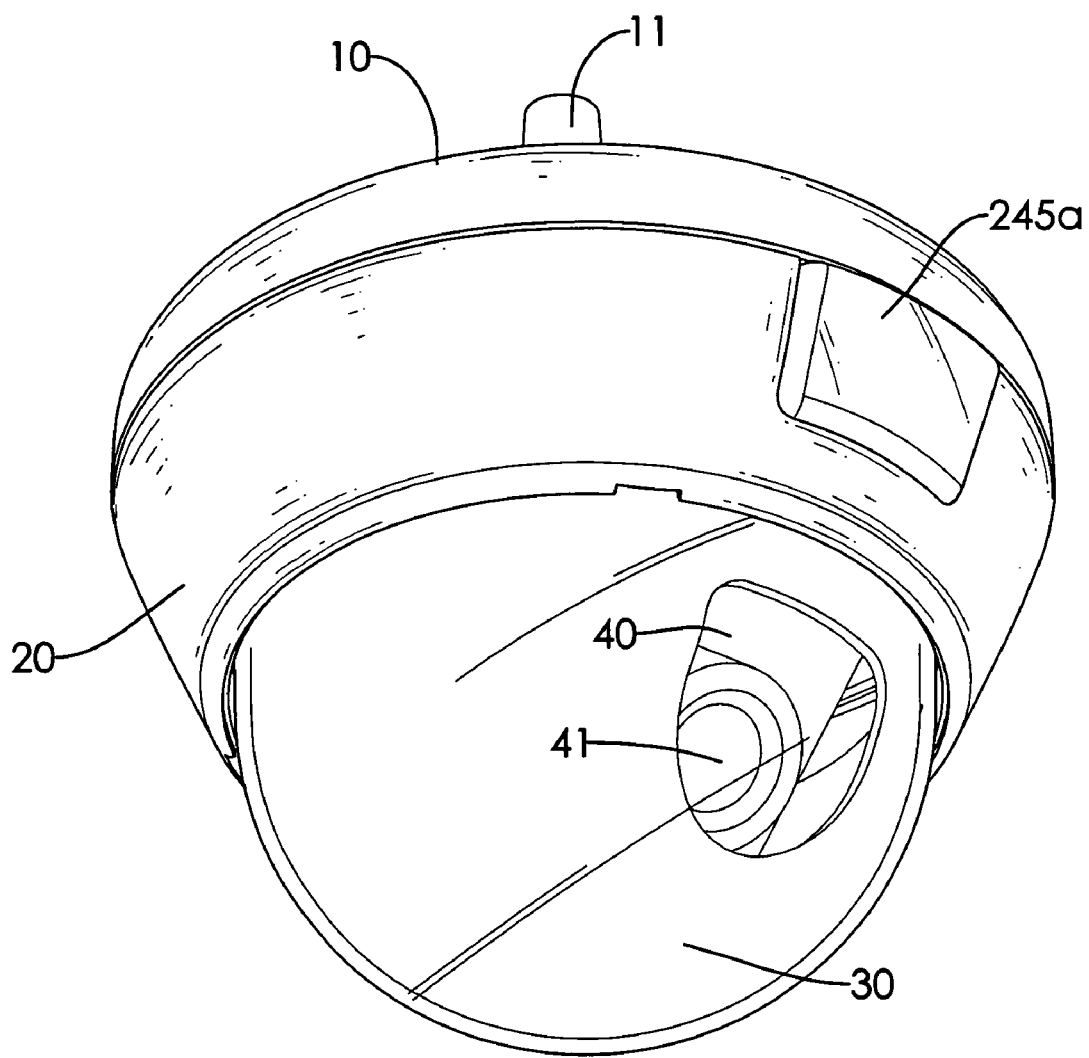
FIG. 1 is a perspective view of a first embodiment of a surveillance camera in accordance with the present invention.
Figure 5:
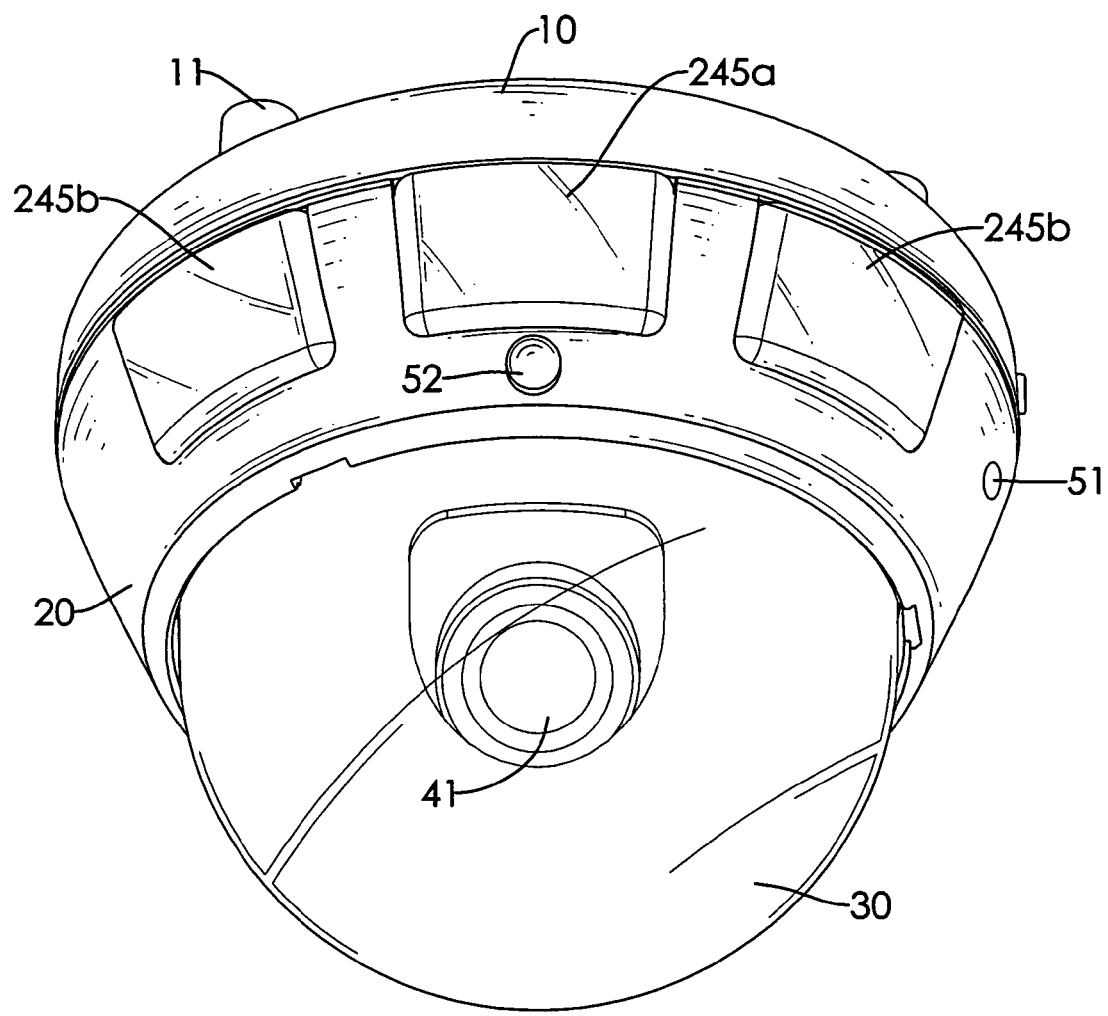
FIG. 5 is a perspective view of a second embodiment of a surveillance camera in accordance with the present invention.

With reference to FIGS. 1 and 5, a surveillance camera in accordance with the present invention comprises an optional positioning base (10), a mounting base (20), a globe (30), a camera assembly (40), an optional light sensor (51) and an optional Passive Infrared (PIR) sensor (52).

Figure 2:
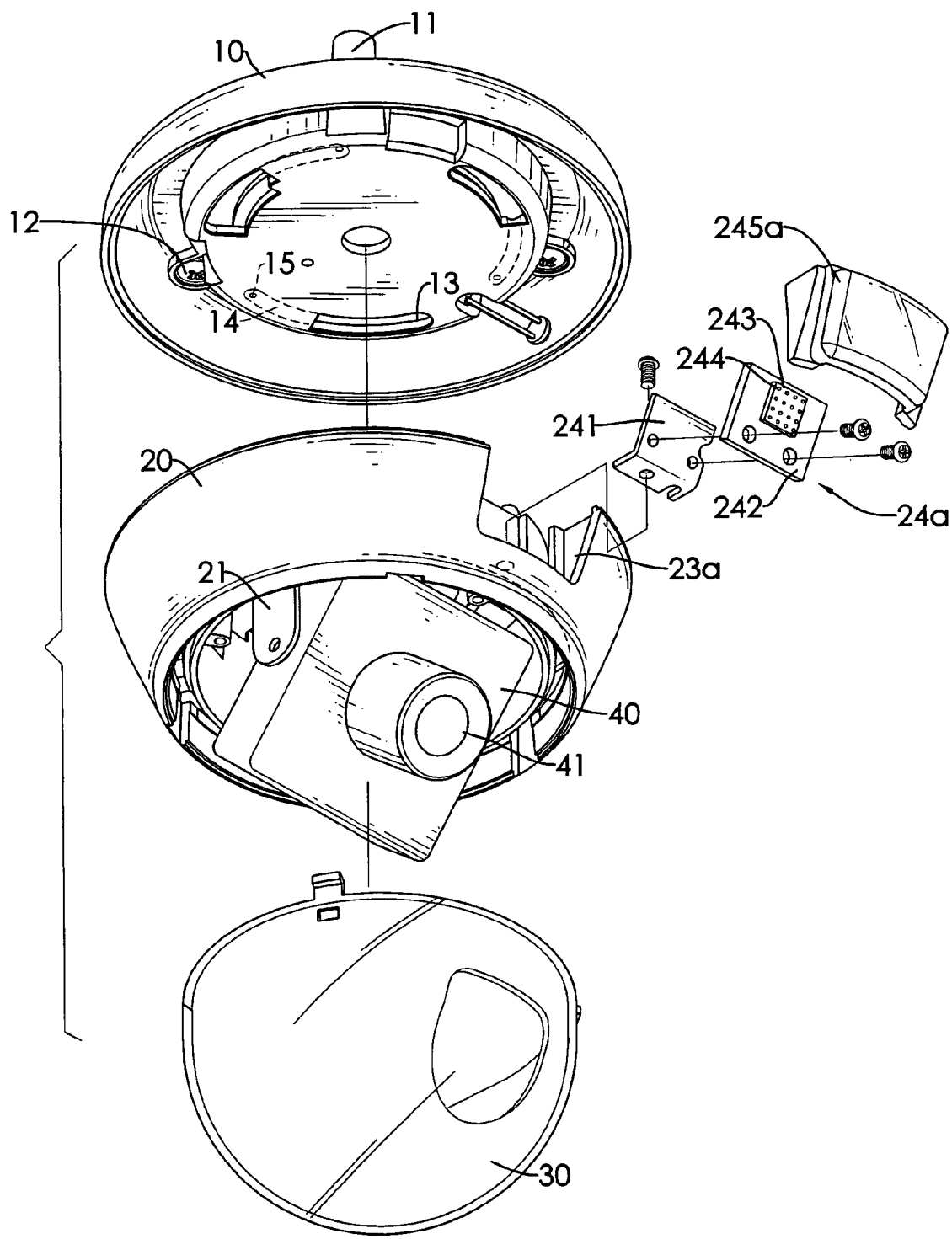
FIG. 2 is an exploded perspective view of the surveillance camera in FIG. 1.

With further reference to FIG. 2, the positioning base (10) is attached to a ceiling, a wall or the like and has a fastening surface, an inner surface, multiple tubes (11), multiple optional screws (12), multiple through holes (13), multiple optional attachment slots (14) and multiple optional detents (15). The tubes (11) protrude from the fastening surface of the positioning base (10), and each tube (11) has a distal end. The screws (12) are mounted respectively through the tubes (11) and protrude from the distal ends of the tubes (11) to attach the positioning base (10) to a ceiling, a wall or the like. The through holes (13) are curved and are formed through the positioning base (10). The attachment slots (14) are formed in the fastening surface of the positioning base (10) and communicate respectively with the through holes (13), and each attachment slot (14) has a distal end. The detents (15) are formed respectively in the attachment slots (14) near the distal ends.

Figure 3:
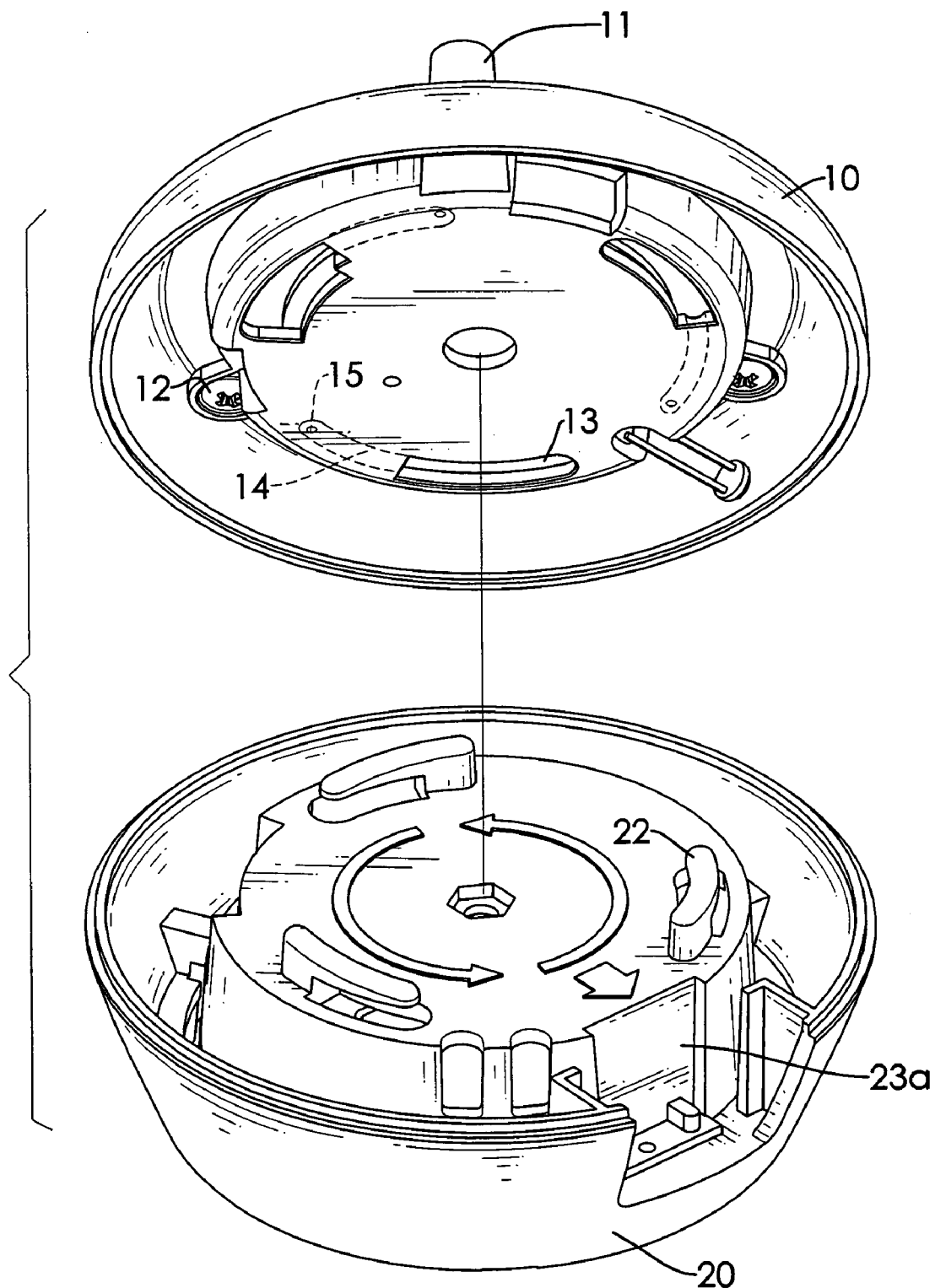
FIG. 3 is a partially exploded perspective view of the surveillance camera in FIG. 1.

With further reference to FIG. 3, the mounting base (20) may be mounted on the inner surface of the positioning base (10) and has an inner surface, an outer surface, a sidewall, a camera recess, two arms (21), multiple optional latches (22), a main panel recess (23a), at least one optional additional panel recess, a main illuminator (24a) and at least one optional additional illuminator.

The sidewall of the mounting base (20) is tapered toward the outer surface and has an inner edge.

The camera recess is formed in the outer surface of the mounting base (20).

The arms (21) are mounted in the camera recess parallel to each other.

Figure 4:
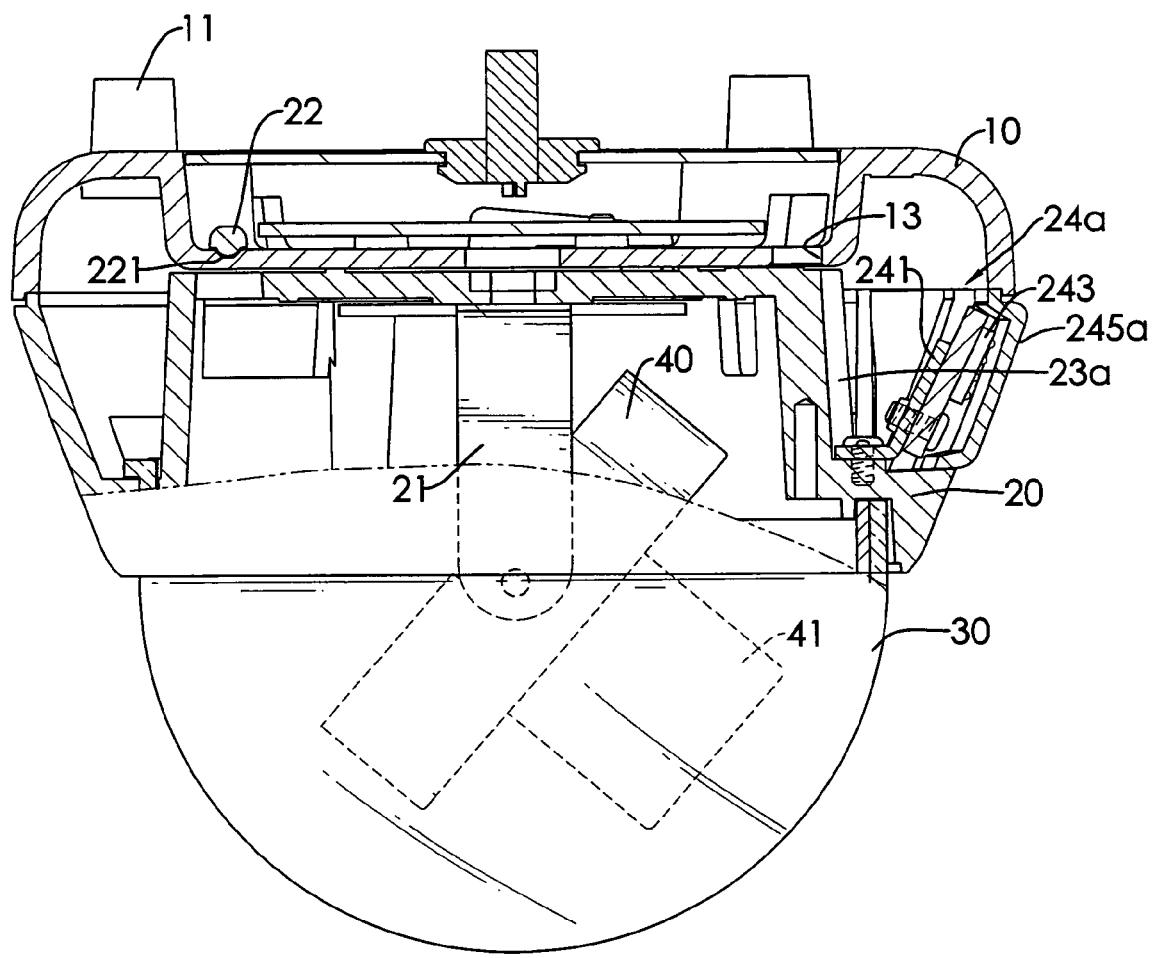
FIG. 4 is a side view in partial section of the surveillance camera in FIG. 1.

With further reference to FIG. 4, the latches (22) are L-shaped, are formed on and protrude parallel to the inner surface of the mounting base (20) and are mounted respectively and selectively through the through holes (13) of the positioning base (10) to allow the mounting base (20) to rotate relative to and attach to the positioning base (10). Each latch (22) has an inner surface, a distal end and an optional boss (221). The boss (221) is formed on the inner surface near the distal end of the latch (22), is opposite to the inner surface of the mounting base (20) and moves along the attachment slots (14) to engage the corresponding detent (15).

Each panel recess (23a) is formed in the inner edge of the sidewall of the mounting base (20) and has a bottom edge.

The main illuminator (24a) is mounted in the main panel recess (23a). The at least one additional illuminators is mounted respectively in the additional panel recess. Each illuminator (24a) provides light to illuminate a desired area of interest and has a bracket (241), a board (242), a substrate (243), multiple light-emitting diodes (LEDs) (244) and a cover (245a, 245b). The bracket (241) is essentially L-shaped, corresponds to the sidewall of the mounting base (20), is mounted in the panel recess (23a) and has a foot and a protruding surface. The foot is connected to the bottom edge of the panel recess (23a). The protruding surface corresponds to the panel recess (23a) and the sidewall of the mounting base (20). The board (242) is attached to the protruding surface of the bracket (241). The substrate (243) is mounted on the board (242). The LEDs (244) are mounted on the substrate (243) in an array. The cover (245a, 245b) is mounted in the panel recess (23a) and covers the board (242), the substrate (243) and the LEDs (244).

The globe (30) is mounted on the outer surface of the mounting base (20).

The camera assembly (40) is mounted pivotally between the arms (21) of the mounting base (20) and has an outer surface and a lens (41). The lens (41) is mounted on and protrudes transversely from the outer surface of the camera assembly (40).

The light sensor (51) is mounted in the sidewall of the mounting base (20) and is electrically connected to the main illuminator (24a) to selectively turn the illuminator (24) on or off depending on light level in the desired area of interest.

The PIR sensor (52) is mounted in the sidewall of the mounting base (20) and is electrically connected each additional illuminator to selectively turn the additional illuminator on or off as people approach or move away from the surveillance camera.

Figure 6:
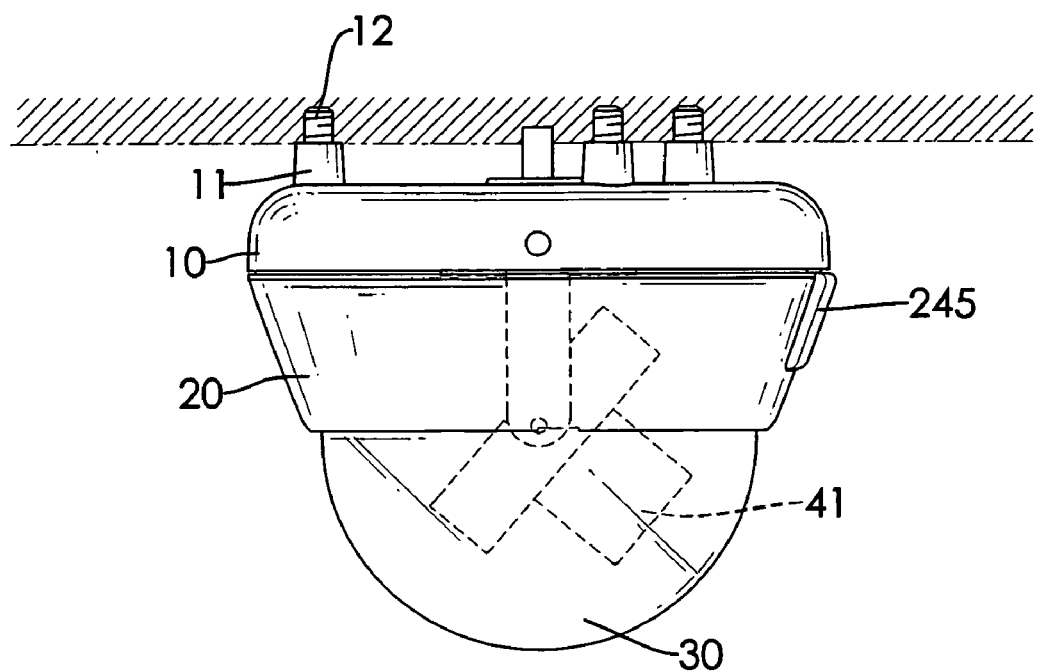
FIG. 6 is an operational side view of the surveillance camera in FIG. 1.
Figure 8:
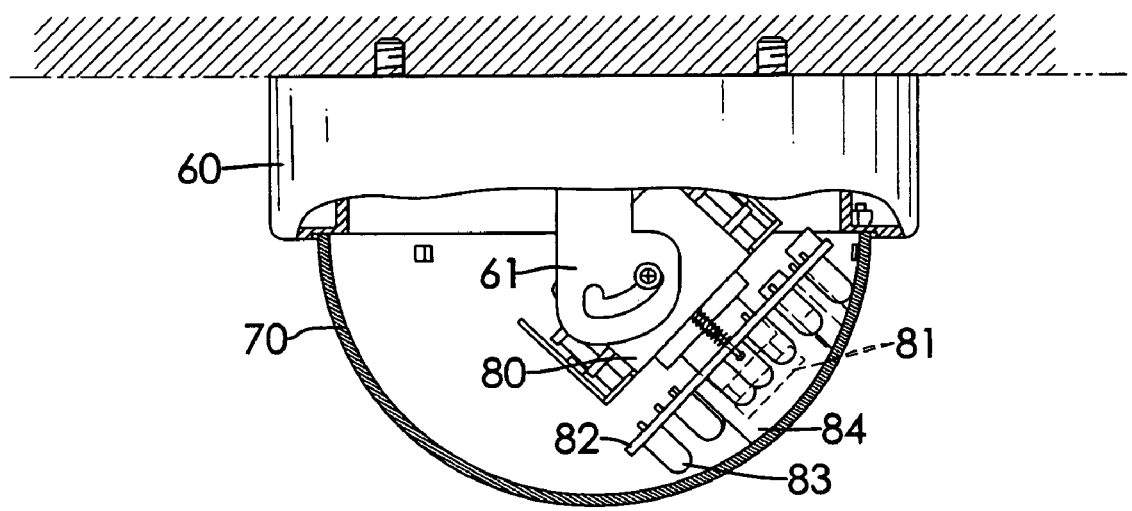
FIG. 8 is an operational side view in partial section of the conventional surveillance camera in FIG. 6.
Figure 7:
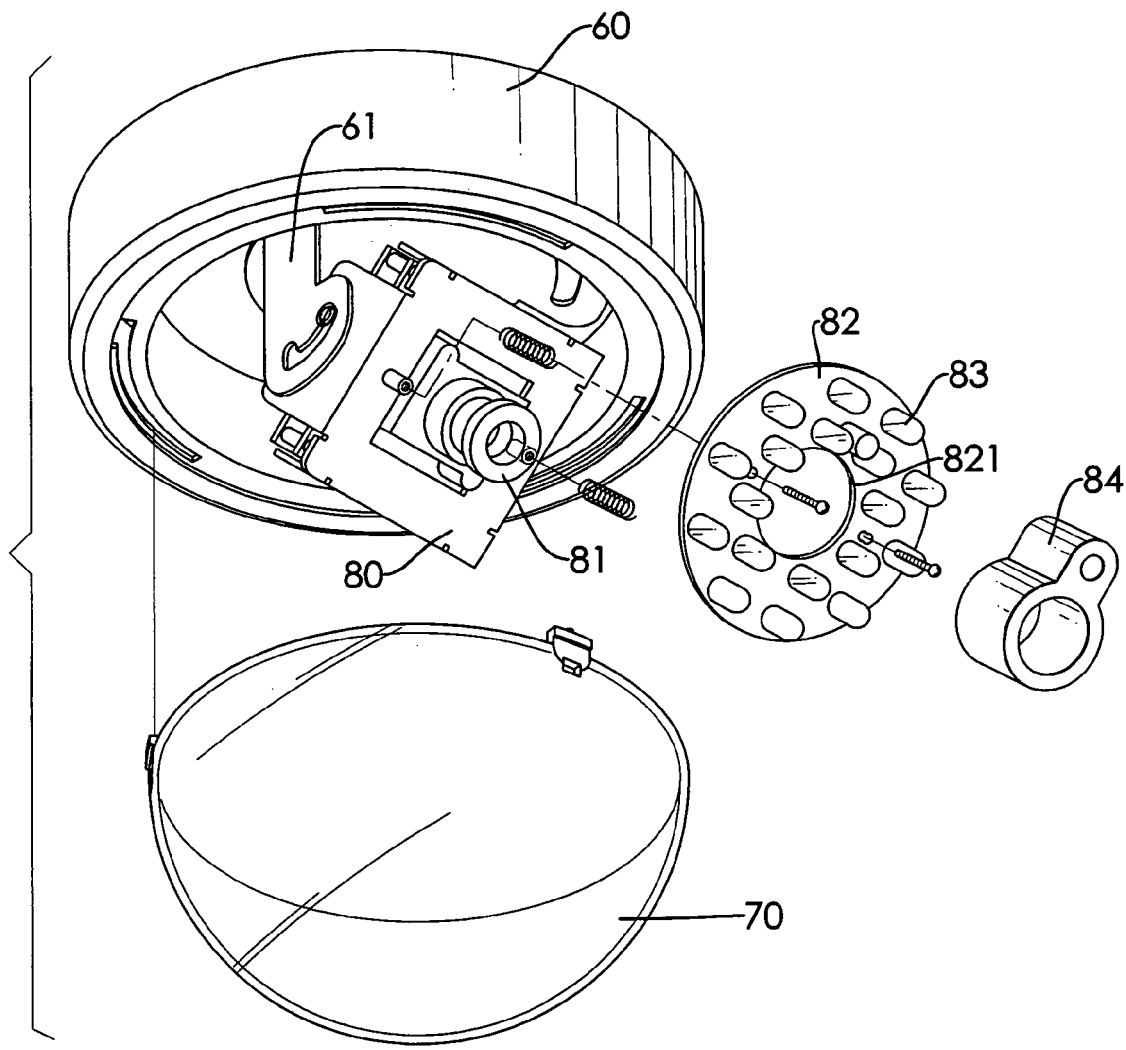
FIG. 7 is an exploded perspective view of a conventional surveillance camera in accordance with the prior art.

With further reference to FIG. 6, the surveillance camera as described has the following advantages. The illuminator (24) has multiple LEDs (244) mounted in the substrate (243) and is bright enough. Therefore, no special lens or design is required to spread light from the LEDs (244) appropriately, and the LEDs (244) will have a wider illuminating range, which covers the area of concern of the camera assembly (40). Therefore, the surveillance camera can get clearer and more complete images. Furthermore, the positioning base (10) is light and thick and people may fasten it easily and exactly to a specific position and then latch the mounting base (20) to the positioning base (10) to form a surveillance camera. People may also rotate the mounting base (20) relative to the positioning base (10) to detach the mounting base (20) to maintain the camera assembly (40) so the camera will not have to be reattached to the wall.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A surveillance camera comprising:
   a mounting base having
   an inner surface;
   an outer surface;
   a sidewall being tapered toward the outer surface and having an inner edge;
   a camera recess being formed in the outer surface of the mounting base;
   two arms being mounted in the camera recess parallel to each other; and
   a main panel recess being formed in the inner edge of the sidewall of the mounting base and having a bottom edge; and
   a main illuminator being mounted in the main panel recess for providing light and having a bracket corresponding to the sidewall of the mounting base and being mounted in the main panel recess;
   a board being attached to the bracket;
   a substrate being mounted on the board;
   multiple light-emitting diodes (LEDs) being mounted on the substrate in an array; and
   a cover being mounted in the panel recess and covering the board, the substrate and the LEDs;
   a globe being mounted on the outer surface of the mounting base; and
   a camera assembly being mounted pivotally between the arms of the mounting base and having an outer surface; and
   a lens being mounted on and protruding transversely from the outer surface of the camera assembly,
   wherein the surveillance camera further has a light sensor being mounted in the sidewall of the mounting base and being electrically connected to the main illuminator.

2. The surveillance camera as claimed in claim 1, wherein the surveillance camera further has a position base having
   a fastening surface;
   an inner surface;
   multiple tubes protruding from the fastening surface of the positioning base, and each tube having a distal end; and
   multiple through holes being curved and being formed through the positioning base; and
   the mounting base is mounted on the inner surface of the positioning base and further has multiple latches being L-shaped, being formed on and protruding parallel to the inner surface of the mounting base and being mounted respectively and selectively through the through holes of the positioning base, and each latch having
- an inner surface; and
- a distal end.

3. The surveillance camera as claimed in claim 1, wherein the mounting base further has at least one additional panel recess being formed in the inner edge of the sidewall of the mounting base and having a bottom edge;
- the mounting base further has at least one additional illuminator being mounted in a corresponding additional panel recess for providing light and each additional illuminator having a bracket corresponding to the sidewall of the mounting base and being mounted in the corresponding additional panel recess;
- a board being attached to the bracket;
- a substrate being mounted on the board;
- multiple LEDs being mounted on the substrate in an array; and
- a cover being mounted in the corresponding additional panel recess and covering the board, the substrate and the LEDs; and
- the surveillance camera further has a Passive Infrared (PIR) sensor being mounted in the sidewall of the mounting base and being electrically connected to the at least one additional illuminator.

4. The surveillance camera as claimed in claim 2, wherein the surveillance camera further has a light sensor being mounted in the sidewall of the mounting base and being electrically connected to the main illuminator.

5. The surveillance camera as claimed in claim 4, wherein
- the mounting base further has at least one additional panel recess being formed in the inner edge of the sidewall of the mounting base and having a bottom edge;
- the mounting base further has at least one additional illuminator being mounted in a corresponding additional panel recess for providing light and each additional illuminator having
  - a bracket corresponding to the sidewall of the mounting base and being mounted in the corresponding additional panel recess;
  - a board being attached to the bracket;
  - a substrate being mounted on the board;
  - multiple LEDs being mounted on the substrate in an array; and
  - a cover being mounted in the corresponding additional panel recess and covering the board, the substrate and the LEDs; and
- the surveillance camera further has a PIR sensor being mounted in the sidewall of the mounting base and being electrically connects to the at least one additional illuminator.

6. The surveillance camera as claimed in claim 5, wherein the positioning base further has
- multiple attachment slots being formed in the fastening surface of the positioning base and communicating respectively with the through holes, and each attachment slot having a distal end; and
- multiple detents being formed respectively in the attachment slots near the distal ends; and
- each latch of the mounting base further has a boss being formed on the inner surface near the distal end of the latch, being opposite to the inner surface of the mounting base and moving along a corresponding attachment slot to engage a corresponding detent.

7. The surveillance camera as claimed in claim 6, wherein the positioning base further has multiple screws being mounted respectively through the tubes and protruding from the distal ends of the tubes.

8. The surveillance camera as claimed in claim 7, wherein the bracket of the illuminator has
- a foot being connected to the bottom edge of the panel recess; and
- a protruding surface corresponding to the panel recess and the sidewall of the mounting base; and
- the board of the illuminator is attached to the protruding surface of the bracket.

9. The surveillance camera as claimed in claim 3, wherein the positioning base further has
- multiple attachment slots being formed in the fastening surface of the positioning base and communicating respectively with the through holes, and each attachment slot having a distal end; and
- multiple detents being formed respectively in the attachment slots near the distal ends; and
- each latch of the mounting base further has a boss being formed on the inner surface near the distal end of the latch, being opposite to the inner surface of the mounting base and moving along a corresponding attachment slot to engage a corresponding detent.

10. The surveillance camera as claimed in claim 9, wherein the positioning base further has multiple screws being mounted respectively through the tubes and protruding from the distal ends of the tubes.

11. The surveillance camera as claimed in claim 10, wherein
- the bracket of the illuminator has
  - a foot being connected to the bottom edge of the panel recess; and
  - a protruding surface corresponding to the panel recess and the sidewall of the mounting base; and
- the board of the illuminator is attached to the protruding surface of the bracket.

* * * * *